(12) United States Patent
Mittenzwei et al.

(10) Patent No.: US 7,729,980 B2
(45) Date of Patent: Jun. 1, 2010

(54) SYSTEMS AND ASSOCIATED METHODS FOR PROVIDING PROJECTED INCENTIVE BASED LOANS

(75) Inventors: Phil Mittenzwei, Peachtree City, GA (US); Rimas Kapeskas, Dunwoody, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 1367 days.

(21) Appl. No.: 10/884,581

(22) Filed: Jul. 1, 2004

(65) Prior Publication Data

US 2006/0004650 A1 Jan. 5, 2006

(51) Int. Cl.
*G06Q 30/00* (2006.01)

(52) U.S. Cl. .......................................... 705/38; 705/14

(58) Field of Classification Search .................. None
See application file for complete search history.

(56) References Cited

U.S. PATENT DOCUMENTS

| | | | | |
|---|---|---|---|---|
| 5,297,026 A * | 3/1994 | Hoffman | | 705/14 |
| 6,006,207 A | 12/1999 | Mumick et al. | | |
| 6,260,024 B1 * | 7/2001 | Shkedy | | 705/37 |
| 6,424,951 B1 * | 7/2002 | Shurling et al. | | 705/14 |
| 7,072,851 B1 * | 7/2006 | Wilcox et al. | | 705/14 |
| 7,133,848 B2 * | 11/2006 | Phillips et al. | | 705/400 |
| 7,219,071 B2 * | 5/2007 | Gallagher | | 705/14 |
| 7,266,525 B1 * | 9/2007 | Duncan | | 705/39 |
| 7,464,049 B2 * | 12/2008 | Maikuma et al. | | 705/26 |
| 2002/0002492 A1 * | 1/2002 | Okazawa | | 705/14 |
| 2002/0035537 A1 * | 3/2002 | Waller et al. | | 705/37 |
| 2002/0046101 A1 | 4/2002 | Ogawa et al. | | |
| 2002/0052816 A1 * | 5/2002 | Clenaghan et al. | | 705/36 |
| 2002/0069150 A1 * | 6/2002 | Ni | | 705/36 |
| 2002/0095361 A1 * | 7/2002 | Trenk et al. | | 705/35 |
| 2002/0103746 A1 * | 8/2002 | Moffett, Jr. | | 705/37 |
| 2002/0120570 A1 * | 8/2002 | Loy | | 705/40 |
| 2002/0188535 A1 * | 12/2002 | Chao et al. | | 705/35 |
| 2003/0135447 A1 * | 7/2003 | Blanz et al. | | 705/38 |
| 2003/0233278 A1 | 12/2003 | Marshall | | |

(Continued)

OTHER PUBLICATIONS

Advanced Payments to Purchaser under Purchase Under Purchase Agreeements, Tax Management Memorandum, Washington Jun. 23, 1997 (2 pages).*

(Continued)

*Primary Examiner*—Alexander Kalinowski
*Assistant Examiner*—Bruce I Ebersman
(74) *Attorney, Agent, or Firm*—Alston & Bird LLP

(57) ABSTRACT

An incentive based loan method and related system provides a loan to a purchaser in association with the purchase of goods or services. An amount of purchases to be made by a purchaser, such as a small business, is projected over a period of time. The purchases can be goods or services, such as package shipping services. Based on the amount of the projected purchases, an incentive rate is agreed upon by the seller of the goods or services and the purchaser. In lieu of receiving the discounted rate on the goods or services during the period of time, the present value of the total incentives to be earned over the projection period is loaned to the purchaser. The purchaser thereafter pays list price for the goods or services, and the incentives earned are applied to the required loan payment.

14 Claims, 18 Drawing Sheets

U.S. PATENT DOCUMENTS

| | | | |
|---|---|---|---|
| 2004/0002912 A1* | 1/2004 | Colon et al. | 705/37 |
| 2004/0002925 A1* | 1/2004 | Gordon | 705/401 |
| 2004/0083163 A1* | 4/2004 | Cooper | 705/38 |
| 2004/0148217 A1* | 7/2004 | Lauring et al. | 705/10 |
| 2005/0021457 A1* | 1/2005 | Johnson et al. | 705/39 |
| 2005/0071264 A1* | 3/2005 | Tsoa-Lee et al. | 705/38 |
| 2006/0149668 A1* | 7/2006 | Zafrir | 705/39 |
| 2007/0208608 A1* | 9/2007 | Amerasinghe et al. | 705/10 |

OTHER PUBLICATIONS

What Broker's Say, Investor's Digest, p. 311, May 21, 1999.*
ACE Cash Express Implements State Regulated Loan Strategy PR Newswire, Jan. 1, 2003 DAW002.*
International Search Report from corresponding International Application No. PCT/US05/23375 dated Jul. 1, 2005.

* cited by examiner

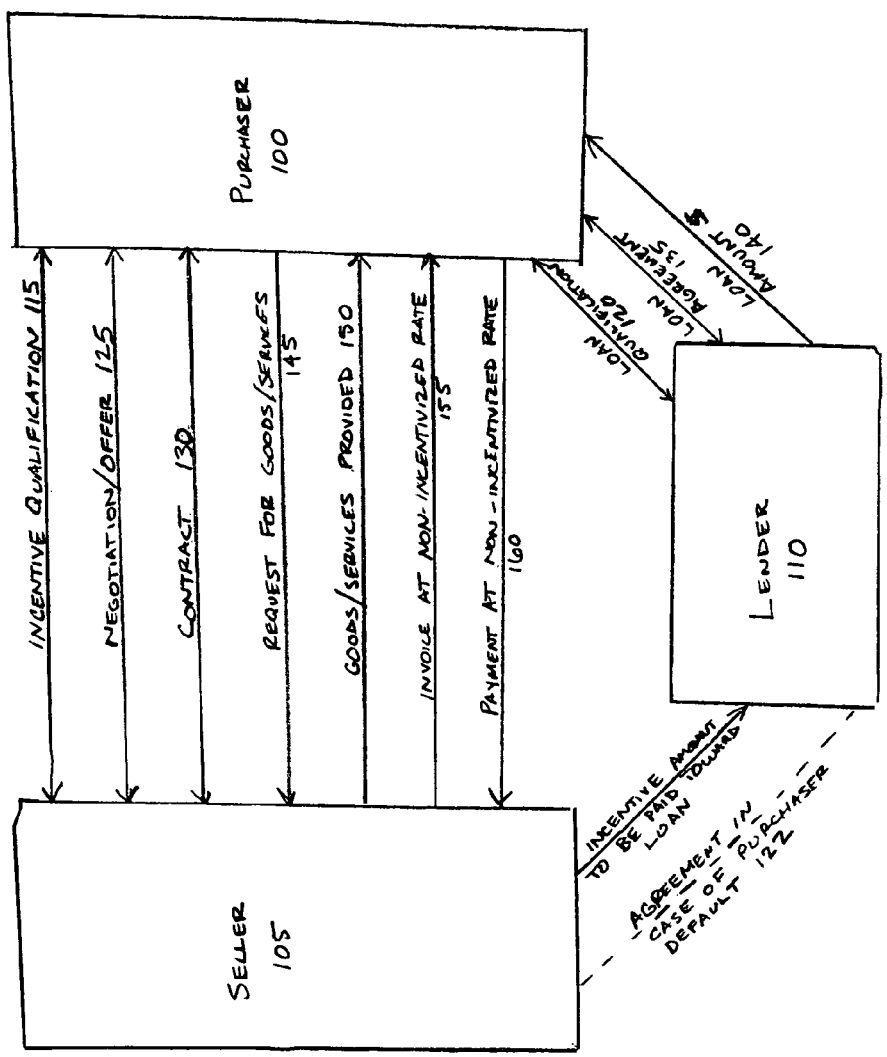

| FIG. 3A Projected Sales and Incentive Amounts | Year 1 | Year 2 | Year 3 | Year 4 | Year 5 | Total |
|---|---|---|---|---|---|---|
| Projected Non Discounted Shipping Service Revenues for Customer | $75,000 | $76,500 | $78,030 | $79,591 | $81,182 | $390,303 |
| Percentage Discount on Shipping Services | 15% | 15% | 15% | 15% | 15% | |
| Amount of Incentive | $11,250 | $11,475 | $11,705 | $11,939 | $12,177 | $58,545 |
| Shipping Services After Discount | $63,750 | $65,025 | $66,326 | $67,652 | $69,005 | $331,758 |

| FIG. 3B Advantage for Seller (Shipping Company) in Making Loan | | |
|---|---|---|
| Seller would have given Purchaser incentives of | $52,442 | 4.50% Present value of incentives at Seller cost of debt |
| Amount of Advance Incentives Loaned to Purchaser | $50,011 | 6.50% Present value at Seller Lending rate |
| Gain on Interest for Seller | $2,431 | |
| Projected Benefit of Reducing Purchaser "Churn" | $5,574 | 9.50% Present Value of Profit on Services due to Customer Retention |
| Net Gain from Advanced Incentive Program | $8,005 | 16.01% Return on Funds/Financing |

| FIG. 3C Advantage to Participating Purchaser | | |
|---|---|---|
| Seller will advance Purchaser | $50,011 | 6.50% Present Value of Total Incentives at Seller Lending Rate |
| Purchaser would otherwise pay interest of | $9,774 | 7.00% Purchaser's Before Tax Cost of Debt outside of program |
| Customer interest under the Advance Incentive Program | $8,907 | 6.50% Purchaser's Before Tax Cost of Debt using program |
| Net gain using Advance Incentive Program | $867 | 0.50% Purchaser's Before Tax cost of Debt Reduction |
| Impact of Advanced Incentives using Internal Rate of Return | $17,222 | 12.00% Purchaser's Internal Rate of Return |

XYZ Company
175-A E 2ND ST
Atlanta, GA 30328

*Incentive Savings*

400

Total Incentive Savings this period $937.50
Your amount due this period includes these savings.
See Incentive summary section for details.
*Account Status Summary*
*Monthly Payment Plan*
Amount Due This Period $6,257.00
Amount Outstanding (prior invoices) $0.00
Total Amount Outstanding $6,257.00
Please include the Return Portion of each outstanding invoice with
your payment. See Account Status for details.

*Thank you for using UPS*
Summary of Charges

| Page | | Charge |
|---|---|---|
| 4 | UPS OnLine WorldShip | $5,312.50 | 404
| 17 | Advance Incentive Loan Repayment | $937.50 | 406  } 402
| 17 | Earned Incentive Credit/Incentive Shortfall | $0.00 | 408
| | Adjustments & Other Charges | $0.00 |
| | Service Charges | $7.00 |
| | Amount due this period | $6,257.00 | 410

UPS payment terms require payment of this invoice by February 13, 2004. Payments not received by March 5, 2004 are subject to a late fee of 5% of the Amount Due This Period. (Details in UPS Tariff available at ups.com)

Note: this invoice may contain a fuel surcharge as described at ups.com. The current fuel surcharge is 6.5%. For more information, visit ups.com.

---

Please tear off and send with your payment in the enclosed envelope. Do not use staples or paper clips.

*Return Portion*

XYZ Company
175-A E 2ND ST
Atlanta, GA 30328

☐ If the billing address is incorrect, mark an "X" in this box and make the appropriate changes above.

Invoice Date January 30, 2004
Invoice Number 00001361 2E024
Shipper Number 13612Z Amount Due this period $6,257.00

UPS
P.O. Box 650580
Dallas, TX 75265-0580

FIG 4A

*Delivery Service Invoice*
Invoice Date
Invoice Number
Shipper Number
Page 17 of 17

FIG 4B

UPS Capital Corp Advance Incentive Loan Payment Summary

|  |  |  |
|---|---|---|
| *Sample Earned Incentive Loan payment due* | | This will not be displayed, informational only |

| | | | |
|---|---|---|---|
| Beginning Loan Balance | 412 | $50,011.39 | |
| Finance Charges incurred this period | 414 | $270.90 | 6.50% Interest Rate |
| Total Outstanding Current Month Loan Balance | 416 | $50,282.29 | |
| | | | |
| Installment Payment Due | 418 | $937.50 | |
| Earned Shipping Incentive applied as loan payment | 420 | ($937.50) | on page 1 of Delivery Service Invoice |
| Earned Incentive Credit / Incentive Shortfall | 422 | $0.00 | on page 1 of Delivery Service Invoice |
| | | | |
| Ending Loan Balance | 424 | $49,344.79 | |

FIG 4C

UPS Capital Corp Advance Incentive Loan Payment Summary

|  |  |  |
|---|---|---|
| *Sample Earned Incentive Loan payment due – Incentive Shortfall* | | This will not be displayed, informational only |

| | | | |
|---|---|---|---|
| Beginning Loan Balance | 426 | $ 50,011.39 | |
| Finance Charges incurred this period | 428 | $ 270.90 | 6.50% Interest Rate |
| Total Outstanding Current Month Loan Balance | 430 | $50,282.29 | |
| | | | |
| Installment Payment Due | 432 | $ 937.50 | |
| Earned Shipping Incentive applied as loan payment | 434 | ($800.00) | on page 1 of Delivery Service Invoice |
| Earned Incentive Credit / Incentive Shortfall | 436 | $137.50 | on page 1 of Delivery Service Invoice |
| | | | |
| Ending Loan Balance | 438 | $49,344.79 | |

FIG. 4D

UPS Capital Corp Advance Incentive Loan Payment Summary

| | | | |
|---|---|---|---|
| Beginning Loan Balance | 440 | $ 50,011.39 | |
| Finance Charges incurred this period | 442 | $ 270.90 | 6.50% Interest Rate |
| Total Outstanding Current Month Loan Balance | 444 | $50,282.29 | |
| | | | |
| Installment Payment Due | 446 | $ 937.50 | |
| Earned Shipping Incentive applied as loan payment | 448 | ($1,200.00) | on page 1 of Delivery Service Invoice |
| Earned Incentive Credit / Incentive Shortfall | 450 | ($262.50) | on page 1 of Delivery service Invoice |
| | | | |
| Ending Loan Balance | 452 | $49,344.79 | |

FIG. 4E

UPS Capital Corp Advance Incentive Loan Payment Summary

| | | | |
|---|---|---|---|
| Beginning Loan Balance | 454 | $ 50,011.39 | |
| Finance Charges incurred this period | 456 | $ 270.90 | 6.50% Interest Rate |
| Total Outstanding Current Month Loan Balance | 458 | $50,282.29 | |
| | | | |
| Installment Payment Due | 460 | $ 937.50 | |
| Earned Incentive applied as loan payment | 462 | ($1,200.00) | on page 1 of Delivery Service Invoice |
| Earned Incentive Credit / Incentive Shortfall | 464 | $0.00 | on page 1 of Delivery Service Invoice |
| | | | |
| Ending Loan Balance | 466 | $49,082.29 | |

| Weekly Domestic Shipping Service Purchases (705) | Ground Discount Percentage (710) | Air Discount Percentage (715) |
| --- | --- | --- |
| $0-$100 | 0.0% | 0.0% |
| $100-$250 | 2.0% | 10.0% |
| $250-$500 | 5.0% | 15.0% |
| $500-$750 | 6.0% | 20.0% |
| $750-$1,000 | 7.0% | 21.0% |
| $1,000-$2,000 | 8.0% | 22.0% |
| $2,000-$3,000 | 9.0% | 23.0% |
| $3,000-$4,000 | 10.0% | 24.0% |
| $4,000-$5,000 | 11.0% | 25.0% |
| $5,000-$6,000 | 12.0% | 26.0% |
| $6,000-$7,000 | 13.0% | 27.0% |
| $7,000-$8,000 | 14.0% | 28.0% |
| $8,000-$9,000 | 15.0% | 29.0% |
| $9,000-$10,000 | 16.0% | 30.0% |
| $10000+ | 17.0% | 31.0% |

Fig. 7A

| Weekly International Shipping Service Purchases (730) | International Discount Percentage (735) |
| --- | --- |
| $0-$50 | 0% |
| $50-$100 | 5% |
| $100-$200 | 10% |
| $200-$400 | 15% |
| $400-$750 | 20% |
| $750-$1,000 | 21% |
| $1,000-$1,250 | 22% |
| $1,250-$1,800 | 23% |
| $1,800-$2,500 | 24% |
| $2,500-$3,500 | 25% |
| $3,500-$5,750 | 26% |
| $5,750-$8750 | 27% |
| $8,700+ | 28% |

Fig. 7B

Enter Customer Gross Revenue Amounts by Shipping Mode
Enter the Customer's UPS and Competitor Weekly Gross Revenue

| | | Weekly Gross Revenue | |
|---|---|---|---|
| | UPS | Competitor | Total Opportunity |
| Ground | $ - | $ - | $ - |
| Air | $ - | $ - | $ - |
| International | $ - | $ - | $ - |
| | Total Customer Gross Revenue | | $ - |
| Payments | Monthly | Annual Interest Rate | 7.5% |

Adjust Gross Revenue | Get Advance Amounts

Fig. 8A

Enter Customer Gross Revenue Amounts by Shipping Mode
*Enter the Customer's UPS and Competitor Weekly Gross Revenue*

| | | Weekly Gross Revenue | | |
|---|---|---|---|---|
| | UPS | Competitor | Total Opportunity | |
| Ground 800 | $ 3,500 | 815 $ - | 830 $ 3,500 | |
| Air 805 | $ 800 | 820 $ - | 835 $ 800 | |
| International 810 | $ 500 | 825 $ - | 840 $ 500 | |
| | | Total Customer Gross Revenue 845 | $ 4,800 | |
| Payments | 846 Monthly | Annual Interest Rate 847 | 7.5% | |

850 — Adjust Gross Revenue | Get Advance Amounts — 855

Fig. 8B

Enter Customer Gross Revenue Amounts by Shipping Mode

Enter the Customer's UPS and Competitor Weekly Gross Revenue

Weekly Gross Revenue

| | | UPS | | Competitor | | Total Opportunity |
|---|---|---|---|---|---|---|
| Ground | 800 | $ 3,500 | 825 | $ - | 830 | $ 3,500 |
| Air | 805 | $ 800 | 820 | $ - | 835 | $ 800 |
| International | 810 | $ 500 | 825 | $ - | 840 | $ 500 |
| | | | | Total Customer Gross Revenue | 845 | $ 4,800 |
| Payments | | Monthly | | Annual Interest Rate 847 | | 7.5% |

850 [ Adjust Gross Revenue ]    [ Get Advance Amounts ] 855

Advance Range

| | | 3-Year Advance | | 4-Year Advance | | 5-Year Advance |
|---|---|---|---|---|---|---|
| Low | 860 | $ 74,800 | 875 | $ 99,700 | 890 | $ 124,700 |
| Middle | 865 | $ 106,900 | 880 | $ 142,500 | 895 | $ 178,100 |
| High | 870 | $ 138,900 | 885 | $ 185,200 | 897 | $ 231,500 |

Monthly Payment Amounts

| | | 3-Year Advance | | 4-Year Advance | | 5-Year Advance |
|---|---|---|---|---|---|---|
| Low | 900 | $ 2,312 | 915 | $ 2,396 | 930 | $ 2,483 |
| Middle | 905 | $ 3,305 | 920 | $ 3,424 | 935 | $ 3,547 |
| High | 910 | $ 4,294 | 925 | $ 4,450 | 940 | $ 4,610 |

Fig. 8C

Enter Customer Gross Revenue Amounts by Shipping Mode
Enter the Customer's UPS and Competitor Weekly Gross Revenue

| | | Weekly Gross Revenue | | |
|---|---|---|---|---|
| | UPS | Competitor | | Total Opportunity |
| Ground 800 | $ 3,500 815 | $ 1,000 830 | | $ 4,500 |
| Air 805 | $ 800 820 | $ 500 835 | | $ 1,300 |
| International 810 | $ 500 825 | $ 250 840 | | $ 750 |
| | | Total Customer Gross Revenue 845 | | $ 6,550 |
| Payments 846 | Monthly | Annual Interest Rate 847 | | 7.5% |
| 850 | Adjust Gross Revenue | Get Advance Amounts | 855 | |

Fig 8D

Enter Customer Gross Revenue Amounts by Shipping Mode
*Enter the Customer's UPS and Competitor Weekly Gross Revenue*

Weekly Gross Revenue

| | UPS | Competitor | Total Opportunity |
|---|---|---|---|
| Ground | $ 3,500 | $ 1,000 | $ 4,500 |
| Air | $ 800 | $ 500 | $ 1,300 |
| International | $ 500 | $ 250 | $ 750 |
| | Total Customer Gross Revenue | | $ 6,550 |

Payments: Monthly     Annual Interest Rate: 7.5%

[ Adjust Gross Revenue ]   [ Get Advance Amounts ]

Advance Range

| | 3-Year Advance | 4-Year Advance | 5-Year Advance |
|---|---|---|---|
| Low | $ 113,100 | $ 150,800 | $ 188,500 |
| Middle | $ 161,500 | $ 215,400 | $ 269,200 |
| High | $ 210,000 | $ 280,000 | $ 350,000 |

Monthly Payment Amounts

| | 3-Year Advance | 4-Year Advance | 5-Year Advance |
|---|---|---|---|
| Low | $ 3,496 | $ 3,624 | $ 3,754 |
| Middle | $ 4,992 | $ 5,176 | $ 5,361 |
| High | $ 6,492 | $ 6,728 | $ 6,970 |

Fig. 8E

Enter Customer Gross Revenue Amounts by Shipping Mode
*Enter the Customer's UPS and Competitor Weekly Gross Revenue*

Weekly Gross Revenue

|  |  | UPS | | Competitor | | Total Opportunity |
|---|---|---|---|---|---|---|
| Ground | 800 | $ 3,500 | 815 | $ 1,000 | 830 | $ 4,500 |
| Air | 805 | $ 800 | 820 | $ 500 | 835 | $ 1,300 |
| International | 810 | $ 500 | 825 | $ 250 | 840 | $ 750 |
| | | | | Total Customer Gross Revenue 845 | | $ 6,550 |

Payments 846 | Monthly | Annual Interest Rate 847 | 6.0%

[ 850 Adjust Gross Revenue ] [ Get Advance Amounts 855 ]

Advance Range

| | | 3-Year Advance | | 4-Year Advance | | 5-Year Advance |
|---|---|---|---|---|---|---|
| Low | 860 | $ 113,100 | 875 | $ 150,800 | 890 | $ 188,500 |
| Middle | 865 | $ 161,500 | 880 | $ 215,400 | 895 | $ 269,200 |
| High | 870 | $ 210,000 | 885 | $ 280,000 | 899 | $ 350,000 |

Monthly Payment Amounts

| | | 3-Year Advance | | 4-Year Advance | | 5-Year Advance |
|---|---|---|---|---|---|---|
| Low | 900 | $ 3,424 | 915 | $ 3,524 | 930 | $ 3,626 |
| Middle | 905 | $ 4,889 | 920 | $ 5,034 | 935 | $ 5,178 |
| High | 910 | $ 6,357 | 925 | $ 6,543 | 940 | $ 6,733 |

Fig. 8F

Enter Customer Gross Revenue Amounts by Shipping Mode
*Enter the Customer's UPS and Competitor Weekly Gross Revenue*

Weekly Gross Revenue

|  | UPS | Competitor | Total Opportunity |
|---|---|---|---|
| Ground 800 | $ 3,500 815 | $ 1,000 830 | $ 4,500 |
| Air 805 | $ 800 820 | $ 500 835 | $ 1,300 |
| Internationals 810 | $ 500 825 | $ 250 840 | $ 750 |
|  |  | Total Customer Gross Revenue 845 | $ 6,550 |

846
Payments: Weekly    Annual Interest Rate 847    6.0%

Adjust Gross Revenue    Get Advance Amounts

Advance Range

|  | 3-Year Advance | 4-Year Advance | 5-Year Advance |
|---|---|---|---|
| Low 850 | $ 113,100 875 | $ 150,800 880 | $ 188,500 |
| Middle 855 | $ 161,500 880 | $ 215,400 885 | $ 269,200 |
| High 870 | $ 210,000 885 | $ 280,000 890 | $ 350,000 |

Weekly Payment Amounts

|  | 3-Year Advance | 4-Year Advance | 5-Year Advance |
|---|---|---|---|
| Low 900 | $ 792 915 | $ 815 930 | $ 839 |
| Middle 905 | $ 1,131 920 | $ 1,164 935 | $ 1,198 |
| High 910 | $ 1,470 925 | $ 1,513 940 | $ 1,557 |

Fig. 8G

SYSTEMS AND ASSOCIATED METHODS FOR PROVIDING PROJECTED INCENTIVE BASED LOANS

BACKGROUND OF THE INVENTION

1. Field of the Invention

This invention is directed to systems and methods for providing and servicing loans to purchasers in conjunction with goods or services. The systems and methods disclosed are also directed to customer retention.

2. Description of the Related Art

Sellers of goods and services often discount charges from a list price. For example, generally, the purchase price of goods or services can be reduced if those goods or services are purchased in relatively large amounts. This is of course due to the economics related to the transaction, specifically, the amount of profit that can be achieved by a seller of those goods or services for the amount being purchased. A seller may be willing to offer a discount for goods or services purchased in large quantities in order to secure the sale to the purchaser and perhaps the purchaser's future patronage. The discount may reduce the per unit profit on those goods or services for the seller. However, the transaction may be economically attractive to the seller due to a number of factors. Normal per unit prices charged for goods or services (sometimes referred to as "list price") may be set according to assumptions regarding the transaction costs that assume purchases will be made in small amounts. Transaction costs may be reduced significantly when a large amount of goods or services are purchased. If a large quantity is purchased, then those assumptions may no longer apply, and profit margins might not be reduced significantly when volume discounts are offered, or those margins might not be reduced at all. Furthermore, a seller may have surplus goods or capacity for providing services that would be advantageous to the seller to transfer to purchasers of larger amounts.

Having a sure sale of a quantity of goods or services to a purchaser at a discounted rate may be attractive to a seller as opposed to uncertain sales at a higher rate. A seller can also use discounted goods or services as a marketing tool to make the seller's products more attractive as compared to a competitor to convince a purchaser to shift business away from the goods or services of competitors. Sellers can also use discounts to retain and reward existing customers.

A purchaser who plans to obtain a significant amount of goods or services therefore has a potentially attractive bargaining position when seeking a source or sources for the goods or services. The purchaser can approach the seller and negotiate a discount due to the large amount of good or services planned to be purchased. Likewise, if a seller approaches the purchaser, the purchaser can attempt to lower the seller's asking price based on the needed quantity of goods or services. The seller can also approach a purchaser marketing their goods or services at a discount. The seller can use incentives as a competitive advantage to secure the purchaser's patronage. The seller and purchaser generally negotiate to a price or rate that is agreeable to both parties, and which commonly redistributes additional profit due to the large purchase across both parties in some percentages.

A counterpart to this concept of reduced prices for quantity purchases is the concept of providing incentives to purchasers for progressive purchases made over time. For example, a seller might offer to sell items to a purchaser at a list price for the first ten items purchased, but offer a reduced price on the next ten and an even deeper discount for the following ten.

Another potential way to structure volume discounts is to make a projection of the quantity of goods or services that will be required by the purchaser over a given period of time. The amounts may not be known precisely due to the unknown demands of the purchaser's customer base or other unforeseeable factors. Using historical information, market data, purchaser plans, etc., however, the amount of goods or services required by the purchaser can be projected. Using this projection, the purchaser and the seller can then negotiate to reach agreement on pricing for the goods or services based on the projected need. Any agreement on pricing could then also include provisions for the eventuality that the actual amount of goods or services purchased over the period of time exceeds or falls short of the projected amount of goods or services.

Other motivations and arrangements for providing price incentives or discounts for goods or services exist. Each of these arrangements allows a purchaser to receive a discount from normal or list pricing, based, for example, on the volume of goods or services purchased, or planned to be purchased. In those cases where a purchaser makes a bulk purchase and the goods or services are purchased immediately, the amount saved by the purchaser in the bulk transaction is immediately available to the purchaser at that time. If the purchaser is a business, which volume purchasers commonly are, then the savings from the discount are available for other expenditures. This is particularly advantageous for small businesses where operating capital is at a premium.

Unfortunately for purchasers whose purchases are spread over a period of time due to the nature of the goods or services purchased or their planned use, etc., the savings due to a volume discount are not available to those purchasers until the purchases are actually made. It would be advantageous for such businesses to be able to obtain the value of a volume discount or incentives to be earned over a period of time in a lump sum. Where those purchasers are businesses, having the savings upfront would provide those businesses with operating capital that could be used in the business during the purchasing period. Indeed, the capital could be instrumental in enabling those businesses to purchase the amount of goods or services upon which the discount is based.

Furthermore, it is in the best interest of the purchaser and the seller for the purchaser to meet its planned purchase levels. It is also in the best interests of the seller to retain the patronage of the purchaser so that the purchaser continues to buy goods or services from the seller through the specified period of time over which purchases have been projected and beyond.

In the past, some companies have implemented programs where advances on marketing funds built into the cost of their products are provided to purchasers to be used for buying related equipment. A beverage supplier, for example, may price their beverages or syrup and supplies such that a portion of the purchase price is collected by the beverage supplier but later returned to the purchaser expressly for marketing the beverage supplier's products. In some arrangements, the beverage supplier has agreed to provide the purchaser with an advance on these marketing funds to purchase equipment for dispensing or vending the beverage supplier's products. For example, the beverage supplier may provide a purchaser with a three-year advance on the marketing funds to be spent towards the purchase of a soft drink vending machine. The purchaser would then need to purchase supplies from the beverage supplier order to cover the amount advanced. Until the advance is paid back, the purchaser would not receive the marketing funds from the beverage supplier as they are applied to cover the advance. Under these programs the purchaser simply continues to buy products from the beverage supplier, for example, until the advance is paid back. These programs have the disadvantage that the purchaser may not know the length of time that it must purchase beverages from the beverage supplier in order to pay back the advance. Furthermore such programs are inflexible as to what the advanced money is used for. That is, the purchaser is restricted and cannot spend the advance freely as it could spend its own operating capital.

What is needed then is a system and method for offering a purchaser new sources of operating capital while at the same time providing a way for a seller to provide incentives beneficial to purchasers without substantially reducing the seller's profit margin. Ideally, such a system and method would encourage a purchaser to obtain needed goods or services from the seller, and also foster goodwill between the purchaser and seller.

BRIEF SUMMARY OF THE INVENTION

The present invention seeks to provide a solution that meets the above-described need in the art by providing a system and method of providing a loan in association with the purchase of goods or services whereby a purchaser is loaned an amount of money based on the projected value of incentives to be earned on purchases made over a period of time. As the incentives are earned they can periodically be applied to a required loan payment. In one embodiment of the invention, the loan is provided in conjunction with package shipping services.

In one embodiment of the invention, if the actual incentives earned on the goods or services fall short of the projected incentives such that the actual incentives do not cover the required loan payment, the purchaser can be billed for the shortfall. If the actual incentives earned exceed the required loan payment such that there is an excess of incentives after applying the incentives to the required loan payment, the excess can be refunded to the purchaser. Alternatively, the excess amount can be discounted from the purchaser's bill. The excess amount can also be applied to the loan principal or as a credit on a subsequent bill.

The method can also include providing a statement to the purchaser detailing charges for purchases, showing incentives earned on those purchases, and the amount of incentives applied to a required loan payment. Funds can be collected from the purchaser at an undiscounted price for the goods or services purchased, and a portion of the funds can be applied as payment on this loan where the portion applied to the loan is based on the incentives earned on the goods or services purchased.

The invented method can also include projecting sales revenue for a seller of goods or services from purchases made by a purchaser over a period of time, determining an incentive rate to be offered to the purchaser based on the revenue projection, and loaning the purchaser an amount of money based on the incentive rate and the revenue projection.

A method of borrowing money is also provided whereby a purchaser of goods or services negotiates an incentive rate to be applied to purchases made by the purchaser from a seller over a period of time, and borrowing an amount of money based on the projected value of the incentives to be earned on the purchases over the period of time. The seller can agree to have incentives earned applied against required loan payments, and to pay an additional amount beyond that owed for purchases to cover a loan payment shortfall where the incentives earned during a period are less than the required loan payment.

A system for facilitating the administration of a loan program offered to purchasers in conjunction with the purchase of goods or services is also described that includes a billing module. The billing module is configured to record purchases made by a purchaser, calculate a price for the purchases based on a non-discounted rate for the goods or services purchased, and calculate a price for the goods or services purchased using a discounted rate. The billing module can then generate an invoice indicating the difference between the two prices for the goods or services and an amount to be applied to a required loan payment. The billing module can be further configured to send the generated invoice to the purchaser. Loan balance information can be provided to the billing module by a lender accounting module, and the billing module can be configured to provide the loan balance information on the generated invoice.

A system for calculating an amount for an advance incentive loan is also provided that is configured to receive projected purchase information for a purchaser and calculate the sales revenue on the projected purchases for a seller at a non-discounted rate and a discounted second rate. The system is further configured to calculate the difference between the two revenue amounts, receive a time period variable for the length of the loan, and receive an interest rate to be applied to the loan. The system can then calculate the present value of the difference between the two revenue amounts and calculate a loan amount to be loaned to the purchaser. The system can also be configured to provide an amortization schedule for the loan.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is an overview of interactions and relationships according to an embodiment of the invented system and method.

FIGS. 2A and 2B comprise a flowchart showing a method according to the invention.

FIGS. 3A, 3B, and 3C show projected revenue and incentive values for a purchaser.

FIG. 4A shows an example overview section of an invoice generated according to the present invention.

FIGS. 4B, 4C, 4D, and 4E show examples of incentive loan payment summary sections of invoices generated according to the present invention.

FIGS. 7A and 7B show examples of discount percentages for various shipping services across a range of shipping service purchase levels.

FIGS. 8A, 8B, 8C, 8D, 8E, 8F and 8G depict a computer screen where the computer is configured to perform a projection according to an embodiment of the invention.

DETAILED DESCRIPTION OF THE INVENTION

Figure 2A:
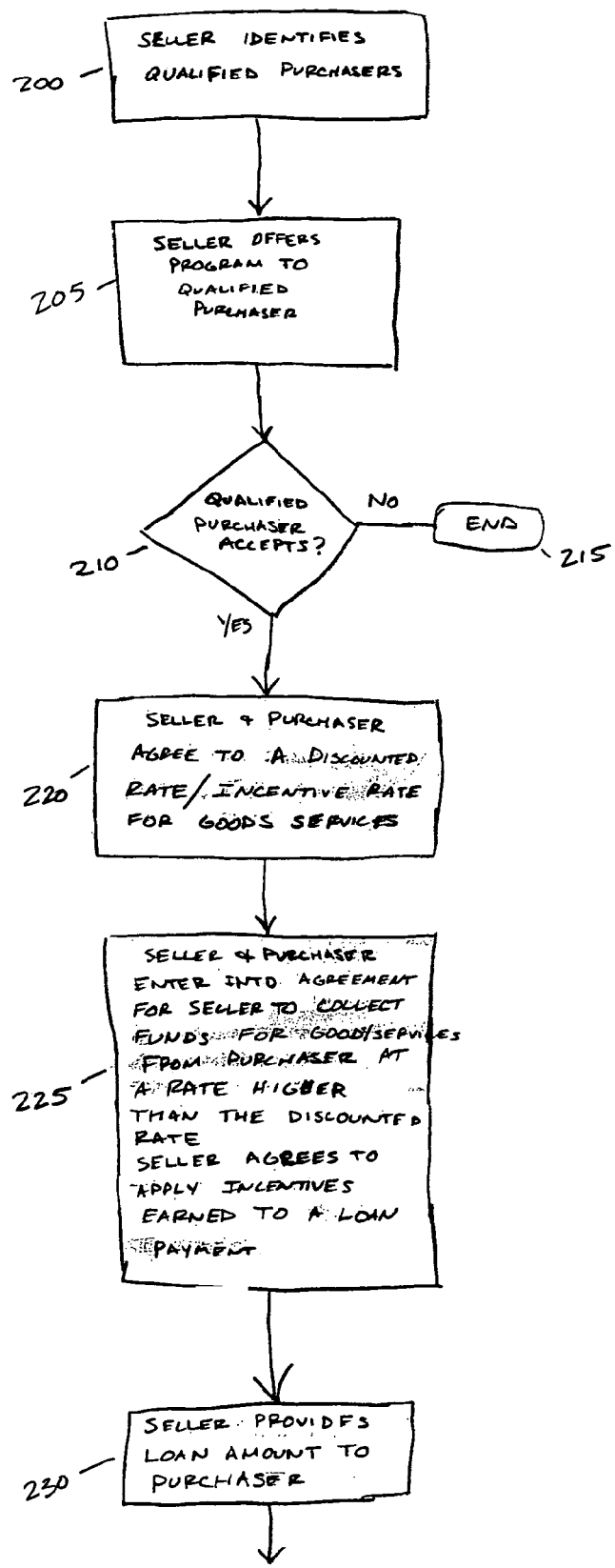

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, the invented method and system can involve the relationships between a purchaser 100, a seller 105, and a lender 110. The purchaser 100 is a purchaser of goods or services (or a combination thereof) from the seller 105. Although the invented system and method can be used in many contexts, the application of the invented system and method in a purchase of services context will be described herein as an exemplary embodiment. More specifically, the use of the system and method where the purchaser 100 buys package delivery services from the seller 105 will be described. In this embodiment, the purchaser 100 is a purchaser of package delivery services, commonly a small business, and the seller 105 is a provider of package delivery services.

As mentioned above, often times discounted rates are offered to customers who purchase large amounts of goods or services. In the package delivery industry, discounts are commonly offered where a customer or potential customer needs to purchase a relatively large amount of package delivery services over an extended period of time. Usually this purchasing entity is a business that ships packages from its location(s) on a regular basis.

Commonly, package delivery companies will only offer discounted rates to qualified businesses, and those businesses that are considered qualified are usually required to commit to purchase a threshold amount of package delivery services during the time period involved. The threshold amount is the amount of package delivery services upon which the discounted rate is based. The required qualifications for a business to be offered/receive a discounted rate, of course, vary by the package service provider, but may include requirements regarding the length of time the business has been in existence, past revenues of the business, amounts of packages shipped in the past (e.g., historical sales data for existing customers), package characteristics (e.g., package size to weight ratio, packages picked up and delivered per day), Dun and Bradstreet information about potential customers, and the market outlook for the type of business, among others. The manner in which a package delivery seller selects qualified purchasers is outside the scope of the present invention, which provides the same functions and advantages regardless of the qualification criteria applied. This preliminary process of determining if a purchaser is qualified to receive a discounted rate (also referred to herein as an "incentive rate" or "discount rate" with the savings being referred to as "incentives" or "discounts") is shown as Incentive Qualification step 115 on FIG. 1.

To determine the discounted rate that the seller 105 offers to the purchaser 100 the seller may conduct a projection of the volume of package delivery services that the purchaser will need over the time period during which the discounted rate for package delivery services will be offered to the purchaser. This projection can be conducted as part of the Incentive Qualification 115, or after a purchaser is qualified, but before an offer of a discounted rate is made. Many business forecasting techniques are well known in the art and will not be covered herein. These techniques can be used to project the amount of package delivery services that a purchaser will need over a stated period. For example, historical data regarding sales made by the purchaser can be used to determine a rate of growth of the purchaser's sales and a percentage of those sales that require shipping services. Using the historical sales information, the rate of growth, and the percentage of sales that will likely need to be shipped, an estimate of the purchaser's package delivery needs can be projected. Many other factors can of course be used in making the projection, including levels of shipping service likely required by the purchaser, parcel sizes, and pick up and delivery locations, among others.

The package delivery provider, seller 105, can have a schedule of standard discount rates that are offered to businesses with similar package delivery needs. Such a schedule may be adhered to or a discount rate may be negotiated between the seller 105 and the purchaser 100. Methods and systems for setting prices in a competitive context are disclosed in international patent application publication number WO 00/52605, published Sep. 8, 2000. This publication, hereby incorporated by reference, discloses a target pricing system for goods and services for use in a competitive bidding context.

The value of the incentives that will be earned over the time period can also be projected. The projected value of the incentives that will be earned during the time period can be determined, for example, by calculating the total charges for the projected amount of shipping services if no discount were applied and subtracting the total charges for those shipping services at the discount rate that will be applied during the time period.

The Negotiation/Offer step 125 can include the seller 105 and the purchaser 100 discussing a discount rate that will be applied to charges for shipping services, a length of time that this discount rate will be applied, an amount of shipping services that the purchaser will commit to buy from the seller, and the seller offering the purchaser a loan in conjunction with the purchase of the shipping services.

According to the present invention, the seller 105 can use the projected value of the incentives to be earned over the stated time period to offer a loan to the purchaser 100. This may be accomplished through a lender 110 with whom the seller has previously arranged to provide loans in conjunction with shipping services. The lender can be a bank or other financial institution, but it should be recognized that the lender 110 could also be a subsidiary of, a division of, or entity otherwise affiliated with the seller 105. In other embodiments, the seller itself can perform the functions of the lender. In any case, additional paperwork involved in the lending process is preferably kept to a minimum to simplify the transaction such that representatives of the seller 105 can handle the transaction. This makes the loan offer more attractive than loans from other sources that require extensive paperwork.

The lender conducts a Loan Qualification 120 for the purchaser 100. This conventional qualification may occur before or after the Incentive Qualification step 115. Alternatively, the Loan Qualification 120 may occur in two parts, where a prequalification step is conducted before a potential purchaser is told of the incentive based loan program of the current invention, and a more detailed qualification is conducted later when the amount of the loan to be provided is known. More details regarding projection of the to-be-earned incentive values, calculating the present value of those incentives, and the loan amount will be provided below.

The dashed line shown between the seller 105 and the lender 110 labeled Agreement in Case of Purchaser Default 122 represents an agreement that may exist between the two entities as to who shoulders the risk in the event the purchaser defaults on the loan. The line is shown as dashed because any such agreement is optional. In addition, if the lender 110 and the seller 105 are part of the same company or are similarly related, such an agreement may not be necessary.

If the purchaser 100 wishes to enter into an agreement to buy shipping services from the seller 105 at the discount rate offered and obtain a loan in conjunction with the purchase of the shipping services, the seller 105 and the purchaser execute a contract, shown on FIG. 1 at 130. The lender 110 and the purchaser 100 execute a loan agreement, shown on FIG. 1 at 135. As mentioned previously, any loan paperwork separate from what would otherwise be required to complete a discount rate agreement without a loan is preferably kept to a minimum. This may involve integrating loan agreements into other forms used by the seller 105 in the sale of shipping services.

Upon the purchaser 100 entering into the agreement with the seller 105 and the lender 110, the lender provides the purchaser with the agreed upon loan amount shown at 140 on FIG. 1. The amount of the loan depends on the projected value of the incentives to be earned by the purchaser over the time period of the agreement. The amount loaned to the purchaser can be thought of as an advance on incentives that are yet to be earned on shipping services. As such the system and method of the present invention may be referred to below in some contexts as an "advance incentive loan".

During the life of the agreement, the purchaser 100 can request shipping services from the seller 105, shown at 145 on FIG. 1. The seller, in turn, provides the requested shipping services at 150. At 155, after a billing cycle, generally a month, the seller provides an invoice to the purchaser, described below in connection with FIGS. 4A, 4B, 4C, 4D, and 4E. The total amount required to satisfy the bill, however, is calculated at the non-discounted rate for shipping services. The bill can show the amount of shipping charges at the discounted rate, the amount of charges at the non-discounted rate, and the required loan payment for the billing cycle. As will be described later, the required loan payment will be satisfied by the amount of the shipping discounts if the purchaser 100 has purchased shipping services at the committed level during the billing cycle.

At 160, the purchaser 100 pays the amount of the invoice to seller 105. The amount paid is for the shipping charges at the non-discounted rate. The amount paid in excess of the shipping charges at the discounted rate is then sent from the seller to the lender 110 at 160 to satisfy the loan payment for the billing cycle. The purchaser continues to buy shipping services from the seller through the life of the agreement. Invoices continue to be sent at the non-discounted rate, and the amount of the incentives earned each month are applied to the loan payment. This can continue until the loan is paid back.

FIG. 2A shows a flowchart of an embodiment of the invented method. It should also be understood that a computer system configured according to the present invention can be used to execute the steps illustrated in the flowchart of FIGS. 2A and 2B. In the embodiment depicted, the seller 105 also acts as the lender 110. That is, the seller loans the money to the purchaser and otherwise performs the functions of the lender previously described. A department within, or a subsidiary of, the seller may perform the lending related functions. The method starts at step 200 where the seller 105 identifies qualified purchasers. This step can be performed for example, by a seller reviewing a list of data on a number of present shipping service customers and potential shipping services customers to determine if the candidate companies meet the requirements for the advance incentive loan program. The reviewed data may include the length of time the business has been in existence, past revenues of the business, amounts of packages shipped in the past (e.g, historical sales data for existing customers), Dun and Bradstreet information about potential customers, and the market outlook for the type of business, among others. Requirements for the program may include a minimum credit score, a minimum volume of shipping business, and a minimum time that the customer or potential customer has been in business.

After a qualified purchaser has been identified, the seller 105 offers the loan program to the purchaser 100 at step 205. If the purchaser is not interested and turns the offer down at decision block 210, the method ends at 215. If the purchaser chooses to proceed, then the method continues to step 220 where the seller and the purchaser agree to a discounted rate, also referred to as an incentive rate, for shipping services during a stated period of time. The period of time can be three years, four years, or five years, for example.

The seller 105 and purchaser 100 then enter into an agreement for the seller to provide the purchaser a loan at 225. The agreement can provide that the purchaser will pay for, and the seller will collect funds for, shipping services at a rate higher than the discount rate. The agreement can further provide that the seller will apply incentive amounts collected from the purchaser (i.e. amounts collected for the shipping services exceeding the amount that would be paid under the discounted rate) to a loan payment. Once the agreements are in place, the seller provides the loan amount to the purchaser at 230.

Figure 2B:
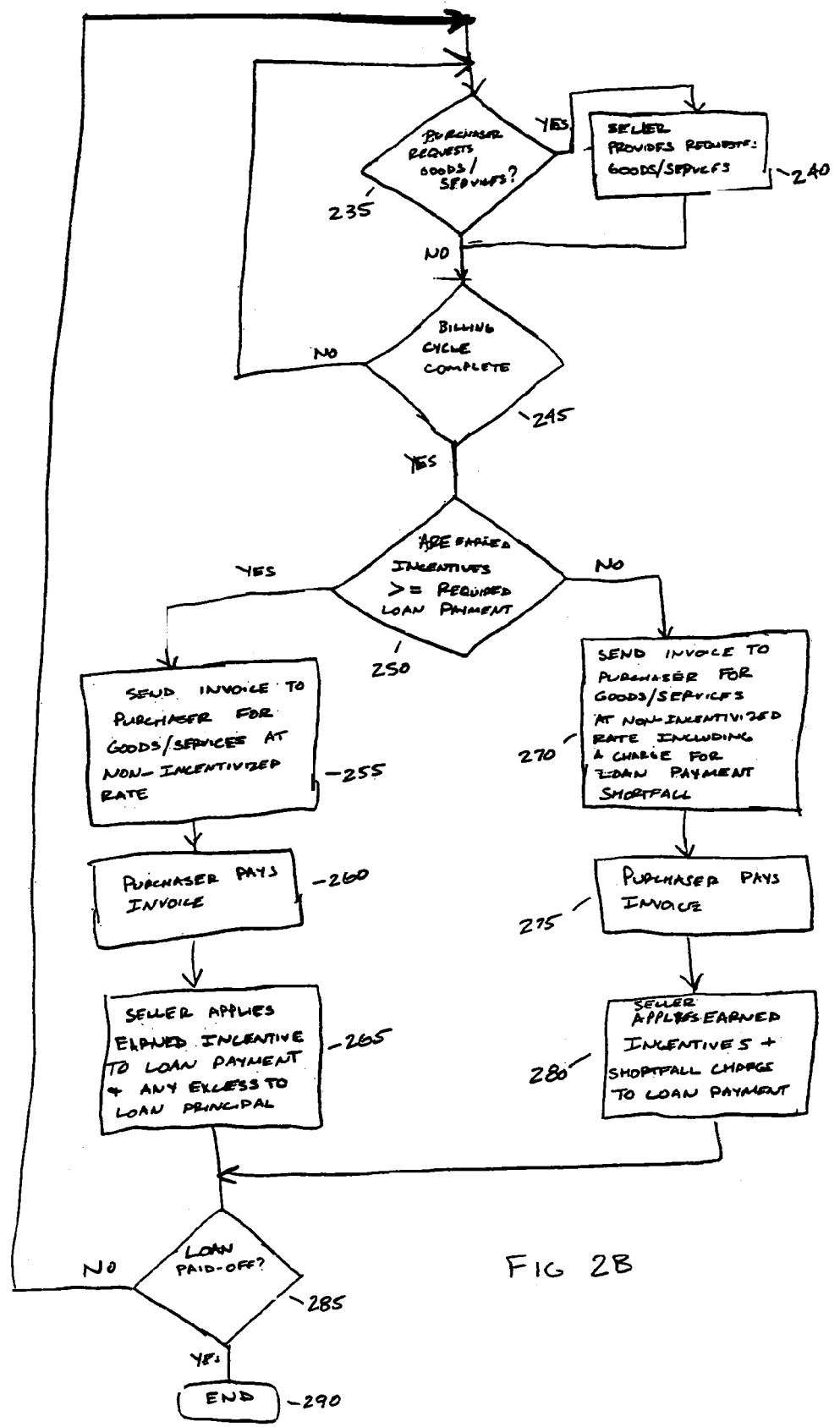

The process continues to FIG. 2B. When the purchaser 100 requests shipping services at 235, the seller 105 provides the requested services at step 240. If the purchaser does not make a request for services, or if the purchaser has made such a request and it has been fulfilled, then the date is checked to determine if the billing cycle is complete at 245. If the billing cycle is not complete, processing returns to 235 to check if the purchaser requests shipping services.

Once the billing cycle is complete, a check is performed to determine if the earned incentives for the billing cycle are greater than or equal to the required loan payment at 250. If the earned incentives are greater than or equal to the required loan payment, the purchaser 100 is sent an invoice for the shipping services purchased, the invoice billing for the shipping services at a non-incentivized rate at step 255. The purchaser pays the invoice at 260, and the seller 105 applies the amount of the earned incentives to a required loan payment and applies any amount of earned incentives exceeding the loan payment amount to the loan principal at step 265. Other uses for incentive amounts that exceed the required loan payment are discussed below including refunding the excess incentives to the purchaser, applying the excess incentives to the current bill, and applying the excess incentives to subsequent bills.

Returning to decision block 250, if the earned incentives are less than the required loan payment, the seller 105 sends the purchaser 100 an invoice for shipping services provided during the billing cycle billed at a non-incentivized rate at step 270. The invoice sent in this step also includes a charge for the amount of the shortfall between the incentives earned during the billing cycle and the required loan payment.

At step 275 the purchaser 100 pays the invoice. The seller 105 then applies the earned incentives plus the amount of the shortfall charge to the required loan payment at step 280.

Following steps 265 and 280, a check is performed at step 285 to determine if the loan has been paid off. If the loan has been paid off then processing ends at 290. Once the loan has been paid off, the purchaser can begin receiving future invoices at the discounted price. If the loan has not been paid off, processing returns to decision block 235. In the method depicted in the flowchart of FIGS. 2A and 2B, the shipping company acts as the lender 110. It should be understood that the lender can be a separate party such as a bank or other financial institution.

FIGS. 3A, 3B, and 3C comprise three tables related to the advance incentive loan. FIG. 3A shows an example of projected sales and to be earned incentive amounts for a purchaser. Projected shipping service revenues are shown for five years. In the example shown, sales revenue increases for each of the consecutive years because an annual growth rate of two percent is projected for the purchaser's business. Although not shown in the example, annual shipping rate increases can also be included in a similar manner. If no annual increases in purchaser's business or shipping rates are projected then the sales revenue can remain steady for each consecutive year. A discount or incentive rate of fifteen percent is used to calculate the amount of the incentives to be earned for the five years shown. The shipping services after discount listed in FIG. 3A are the shipping revenues minus the fifteen percent discount.

FIG. 3B illustrates the advantages of the advance incentive loan program to a seller. In this example, the seller would have allowed the purchaser incentives of $58,545 over the five year time period if the purchaser did not elect to take the advance incentive loan. The incentives may be valued at $52,442, the present value of the projected incentives shown in FIG. 3A at the seller's cost of debt, which is 4.5% in this example, or at $50,011, the present value of the incentive stream at the seller's lending rate of 6.5%. The later amount preferably is the amount that the seller will lend to the purchaser based on the incentives to be earned during the five-year example period. The difference between the present value of the incentive stream at the seller's cost of debt and the seller's lending rate is $2,431 which represents the seller's gain on interest over the five-year period. In addition to the gain on interest, the table also indicates a benefit to the seller due to the retention effects that the loan will have on the purchaser. The advance on the incentives has the added benefit of increasing customer loyalty for the shipping company and reducing customer "churn"—customers switching from one shipping company to another.

The entire future value of the incentives can alternatively be loaned to the purchaser at the outset. In such a case, however, the required monthly payment will be greater than the case where the present value is loaned to the purchaser, due to the higher loan principal. The required payment may also be greater due to a higher interest rate charged.

FIG. 3C indicates the advantages to a purchaser in the example. The purchaser gets $50,011 at the outset to use as they like. Assuming that the interest rate on a loan obtained outside of the advance incentive loan program would be 7%, the purchaser would pay $9,774 of interest on the loan in the five-year period. Under the 6.5% interest rate applied by the shipping company for the advance incentive loan, the purchaser pays $8,907 of interest over the life of the loan. This represents a savings of $867. An important benefit of the advance on the incentive stream is the ability to invest the money in a business. If the purchaser's business has a rate of return of, for example, 12%, the $50,011 from the loan will generate $17,222 over the five years.

In an alternative embodiment, the value of incentives to be earned on purchases made over a period of time can be projected based on the purchaser's current level of weekly shipping service needs. In this embodiment, the purchaser's current level is based on past purchases, but the information is relatively recent such that the data reflects the purchaser's current shipping needs. The purchaser's weekly (or average weekly) purchases of shipping services can be used to determine a discount percentage that a shipping company will offer to the purchaser based on the purchaser's level of shipping service needs. The cost of those services at a list rate can then be multiplied by the discount percentage to calculate the value of the weekly incentives that would be earned by the purchaser. This value can then be multiplied by the number of weeks in the time period over which an amount will be loaned to the purchaser based on the yet-to-be-earned incentives. The resulting value represents a recommended amount that the lender can loan to the purchaser.

FIG. 7A shows example discount percentages that can be offered to purchasers for a range of domestic shipping service purchase levels. Column 705 labeled "Weekly Domestic Shipping Service Levels shows bands of purchase levels over a range from $0 to $10,000. The discount percentage levels that can be offered to a purchaser for the corresponding purchase level band are shown in columns 710 and 715, "Ground Discount Percentage", and "Air Discount Percentage," respectively.

If, for example, a purchaser obtains $3,500 in domestic ground shipping services weekly, then the corresponding ground discount percentage from column 710 is 10%. The $3,500 can be a current average amount of shipping services purchased. That is, the purchaser buys shipping services at a list rate in the amount of $3,500 each week (or does so on average). Multiplying $3,500 by the domestic ground discount percentage of 10% gives a weekly incentive value of $350. Multiplying $350 by 156 weeks (three years) yields $54,600. This amount represents the value of the incentives that would be earned by the purchaser over a three-year period and is a recommended amount that the lender will loan to the purchaser for a three-year period. The amount loaned can be adjusted up or down (for example, a 30% increase or a 30% decrease) depending on the purchaser's desires and whether the shipping company (or lender) is confident that the purchaser will meet the weekly purchase goals over the course of the three-year period.

In this next example, the purchaser will still have the $3,500 of domestic ground weekly shipping needs, but will also be assumed to have $800 of domestic air and $500 of international shipping needs. In this embodiment, total domestic shipping purchases are used to determine the incentive rate to be applied. The $3,500 domestic ground purchases are added to the $800 in domestic air purchases for a total of $4,300 in domestic shipping services. Referring again to FIG. 7A and looking at the weekly domestic shipping services column 705, it can be seen that the corresponding ground discount percentage is 1% and the air discount percentage is 25%. This yields weekly ground incentives of $385 (i.e., $3500*0.11) and air incentives of $200 (i.e., $800*0.25). Referring now to FIG. 7B, the international purchases of $500 qualify for a 20% discount. The weekly international incentives are then $100. The total projected weekly incentive amount for the purchaser in this example is the sum of these amounts (domestic ground incentive+domestic air incentive+international incentive). The purchaser therefore has a projected weekly incentive of $685. Multiplying this weekly incentive projection by the number of weeks in the loan period will yield the recommended loan amount for the purchaser. For a three-year period, the recommended loan amount is $106,860. This amount can be negotiated up or down by the purchaser and the shipping company or the purchaser and the lender. A recommended range is 30% above and 30% below the recommended loan amount.

FIGS. 8A, 8B, 8C, 8D, 8E, and 8F show a computer configured to perform the calculations according to an embodiment of the invention where the bands of purchase levels shown in FIGS. 7A and 7B are used to determine the projected incentive amount. FIG. 8A shows a screen that can appear upon initialization of the program. Boxes 800, 805, 810, 815, 820, and 825 accept dollar amounts that can be entered via an input device of the computer. The first column of boxes (800, 805, and 810) represents amounts of shipping services purchased by the shipper. The second column of boxes (815, 820, and 825) represents shipping services purchased from a competitor of the shipper (in an amount that those services would cost if obtained from the shipping company offering the advance incentive loan). A user can toggle box 846 between "Monthly" and "Weekly" to choose the type of payments to be displayed by the computer. A user can enter an interest rate in the "Annual Interest Rate" field 847. This is the interest rate that will be used to calculate required payment amounts.

FIG. 8B shows the amounts from the previous example entered into the appropriate boxes by a user. Selecting button 855 "Get Advance Amounts", causes the computer to calculate the loan amount to be provided to the purchaser as shown in FIG. 8C. The computer provides loan amounts for 3, 4, and 5 year periods. The computer also provides "Low", "Middle", and "High" values for each of the time periods. The "Middle" amount for each time period corresponds to the amount as calculated in the previous example. The values are slightly different due to rounding. The "Low" and "High" amounts represent a 30% decrease and a 30% increase respectively. A user of the program, an account executive, for example, can use this tool to determine ranges of loan amounts to be offered to purchasers.

The computer also calculates the required payment amounts for the 3, 4 and 5 year periods at the "Low", "Middle", and "High" designations. FIG. 8C shows 3-year advance payment amounts for "Low", "Middle", and "High" at 900, 905, and 910, respectively. 4-year advance payment amounts are shown in boxes 915, 920, and 925. 5-year advance payment amounts are shown in boxes 930, 935, and 940. The payment amounts shown in FIG. 8C are monthly payment amounts because box 846 was set to "Monthly" when the "Get Advance Amounts" button 855 was selected.

Selecting "Adjust Gross Revenue" 850 causes the computer to remove the loan amount calculations and payment amounts and make the entry boxes 800, 805, 810, 815, 820, and 825 accept values once again. FIG. 8D shows a computer screen where values of $1,000, $500, and $250 have been entered by a user in boxes 815, 820, and 825, respectively. This feature is useful in cases where the purchaser is not a current customer of the shipping company, or where the purchaser obtains shipping services from both the shipping company and a competitor. By entering values in the competitor column, a shipping company account executive can inform a purchaser of the amount that can be loaned to the purchaser if the purchaser agrees to transfer the competitor shipping purchases to the shipping company in the future. It should be noted that the amounts in the competitor column represent the amount that the shipping services purchased from the competitor would cost if those services were purchased from the shipping company.

The shipping company and competitor amounts are totaled in the "Total Opportunity Column". Selecting "Get Advance Amounts" 855 causes the computer to display a new set of loan amounts and required payments that include incentives that would be earned if the shipping service purchases from the competitor are transferred to the shipping company offering the advance incentive loan as shown in FIG. 8E.

In FIG. 8F the "Annual Interest Rate" field 847 has been changed by a user to 6%. The payment amounts therefore are recalculated at the 6% interest rate. FIG. 8G shows the computer display upon the user toggling field 846 to "Weekly". The payment amounts shown in this figure represent amounts that would be owed on a weekly basis.

The calculations described in conjunction with FIGS. 7A and 7B, as well as those used in the computer application described in FIGS. 8A, 8B, 8C, 8D, and 8E can alternatively be utilized primarily for loan eligibility purposes. The discount percentages used in the calculations can be average discount percentages offered to other purchasers by the shipping company (determined from historical data) rather than actual incentives that will be offered to the purchaser. Used in this way, the described calculations and computer application can provide a tool for shipping company account executives to determine an amount (or estimate an amount) that can be loaned to the purchaser.

FIG. 4A depicts an example of an invoice summary generated by a system according to the present invention. Line 400 indicates that the purchaser to whom the invoice is to be sent earned an incentive of $937.50 on the shipping services purchased during the invoice's billing cycle. The shipping charges for the period at the discounted rate are shown in line 404. In the example shown in FIG. 4A, the incentives earned during the billing cycle equal the loan payment. Bracketed area 402 refers to two lines of information (406 and 408) from the advance incentive loan payment summary section of the invoice which are included on the invoice summary. Examples of advance incentive loan payment summary sections are shown in FIGS. 4B, 4C, 4D, and 4E and will be described below. The loan payment is listed on line 406, and the difference between the loan payment in the earned incentives is listed on line 408. Again, in this example the incentives earned and the required loan payment are equal so the difference is zero. The total charge to the purchaser for the period is $6,257 which listed on line 410 and is the sum of the charges at the discounted rate plus the required loan payment.

FIG. 4B shows an example of an advance incentive loan summary section of an invoice generated according to the present invention where the incentives earned equal the loan payment. Lines 412 and 414 are included to show how the amount on line 416 is calculated, and these lines would not normally appear on an actual invoice sent to purchasers. Line 412 lists the beginning loan balance of $50,011.39. Line 414 is the amount of finance charges incurred during the current billing cycle. These added together equal line 416, which is the total outstanding loan balance for the advance incentive loan. Line 418 lists the required loan payment for the billing cycle, and line 420 lists the incentives earned during the period. In this example, Line 418 equals line 420 so that there is no incentive credit or shortfall. Incentive credits or shortfalls are listed on line 422 and are zero in this example. Line 424 shows the ending loan balance after the loan installment for the current billing cycle has been applied.

FIG. 4C shows an example of an advance incentive loan summary section of an invoice generated according to the present invention where the incentives earned during the billing cycle are less than the payment due. Lines 426 and 428 are included to show how the amount on line 430 is calculated, and these lines would not normally appear on an actual invoice sent to purchasers. Line 426 lists the beginning loan balance of $50,011.39. Line 428 is the amount of finance charges incurred during the current billing cycle. These added together equal line 430, which is the total outstanding loan balance for the advance incentive loan. Line 432 lists the required loan payment for the billing cycle, and line 434 lists the incentives earned during the period. In this example, line 434 is less than line 432 so that the incentives earned during the billing cycle do not completely cover the required loan payment. Therefore a shortfall exists, and this shortfall is listed on lone 436. Line 438 shows the ending loan balance after the loan installment for the current billing cycle has been applied. This shortfall is then shown at line 408, FIG. 4A, and added to the amount currently due as shown in line 410.

FIG. 4D shows an example of an advance incentive loan summary section of an invoice generated according to the present invention where the incentives earned during the billing cycle exceed the required loan payment and the excess is credited back to the purchaser. Lines 440 and 442 are included to show how the amount on line 444 is calculated, and these lines may not necessarily appear on an actual invoice sent to purchasers. Line 440 lists the beginning loan balance of $50,011.39. Line 442 is the amount of finance charges incurred during the current billing cycle. These added together equal line 444, which is the total outstanding loan balance for the advance incentive loan. Line 446 lists the required loan payment for the billing cycle, and line 448 lists the incentives earned during the period. In this example, line 448 is more than line 446 so that the incentives earned during the billing cycle exceed the required loan payment. In this example, the purchaser is credited the amount shown on line 450 as a credit toward the current shipping bill. Line 452 shows the ending loan balance after the loan installment for the current billing cycle has been applied. Line 408 of FIG. 4A, in this example, would show a credit balance on the bill.

FIG. 4E shows another example of an advance incentive loan summary section of an invoice generated according to the present invention where the incentives earned during the billing cycle exceed the required loan payment. In this example the excess is applied to the loan balance. Lines 454 and 456 are included to show how the amount on line 458 is calculated, and these lines may not necessarily appear on an actual invoice sent to purchasers. Line 454 lists the beginning loan balance of $50,011.39. Line 456 is the amount of finance charges incurred during the current billing cycle. These added together equal line 458, which is the total outstanding loan balance for the advance incentive loan. Line 460 lists the required loan payment for the billing cycle, and line 462 lists the incentives earned during the period. In this example, line 462 is more than line 460 so that the incentives earned during the billing cycle exceed the required loan payment. In this example, the excess is applied to the outstanding loan balance. Line 466 shows the ending loan balance after the loan installment for the current billing cycle and the excess incentive payment have been applied. Line 408, FIG. 4A, in this example, would show as zero or would not be displayed on the bill. FIGS. 4D and 4E both depict instances where the incentives earned exceed the required loan payment. Whether the excess is applied to the principal of the loan or to the current shipping bill can be a customer choice made at the time the loan is initiated, or an option that the customer can choose during the loan period. Alternatively, the shipping company might have purchaser criteria that determine whether the excess is applied to the principal or the bill, or if it is a choice given to the purchaser.

As will be appreciated by one of ordinary skill in the art, the present invention may be embodied as a method, a data processing system, or a computer program product. Accordingly, the present invention may take several forms, including without limitation, an entirely hardware embodiment, an entirely software embodiment, an embodiment combining software and hardware aspects, or a non-computerized embodiment. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the present invention.

These computer program instructions may also be stored in a computer-readable memory that can direct a computer or other programmable data processing apparatus to function in a particular manner, such that the instructions stored in the computer-readable memory produce an article of manufacture including instruction means which implement the present invention. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the present invention.

Figure 5:
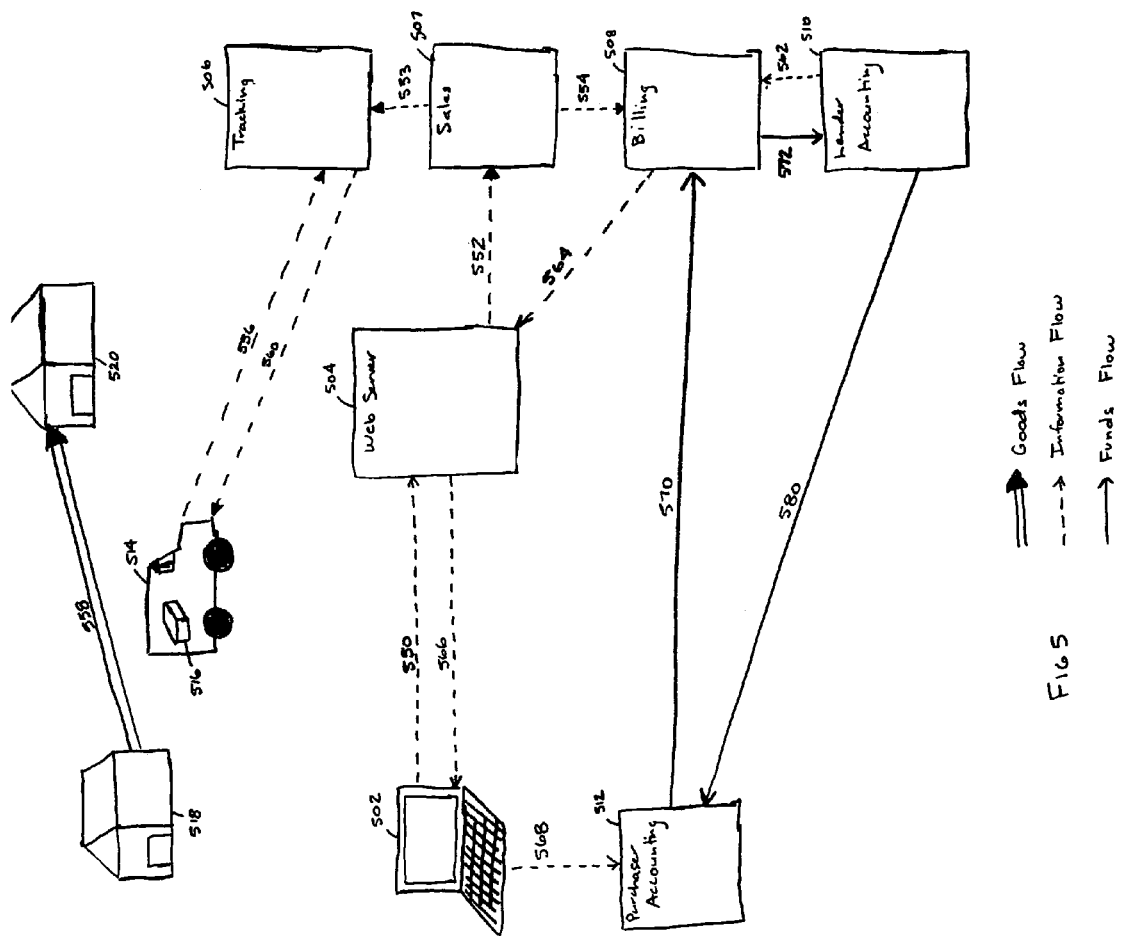
FIG. 5 is a diagram depicting the flow of information, funds, and goods/services according to the present invention.

FIG. 5 depicts the flow of information, funds, and goods/services in a system according to an embodiment of the invention. In FIG. 5, the flow of goods is depicted using a double line, information flow is depicted using a dashed line, and funds flow is depicted using a single solid line. A number of modules are depicted in this figure including a purchaser accounting module 512, a shipping company tracking module 506, a shipping company sales module 507, a shipping company billing module 508, and a lender accounting module 510. These modules can be software programs running on computer hardware having a processor and computer readable media for data storage, such as a server or personal computer. The steps of the invented method can be carried out by updating computer readable memory. It should be understood that the modules such as the tracking 506, sales 507, and billing 508, can each share the same computer hardware or share computer hardware in some combination. These can also be programs running on the same computer hardware that is running the web server 504. Alternatively the programs can have their own dedicated computer hardware. The modules could also be implemented in some combination as subsections of a combined computer program. If the modules do not run on shared computer hardware, the modules can communicate as shown in the figure using a computer network as is well known in the art. The lender may be affiliated with the shipping company such that lending accounting module 510 shares computer hardware with the shipping company modules, or the module can be located on separate computer hardware on the shipping company's local or wide area network. Alternatively, the lender can be an independent third party financial institution such that the lender accounting module 510 is outside of the shipping company's network. In addition, the purchaser accounting module 512, the shipping company billing module 508, and the lender accounting module 510 are preferably interfaced with respective accounts so that these modules can facilitate electronic funds transfers.

Before the purchaser begins ordering shipping services under the advance incentive program, the amount borrowed based on the projected value of the to be earned incentives is transferred from the lender 110 to the purchaser 100. This can occur via electronic funds transfer, by sending a check from the lender to the purchaser via mail or courier, or by hand delivering a check to the purchaser. The transfer of funds from the lender 110 to the purchaser 100 is shown in FIG. 5 as line 580 connecting the lender accounting module 510 to the purchaser accounting module 512, where the lender accounting module 510 and the purchaser accounting module 512 as depicted, have the ability to access accounts in order to facilitate the transfer. The purchaser accounting module 512 can comprise an online banking website of the purchaser's bank where the purchaser 100 has an account.

When the purchaser 100 wishes to order shipping services, the purchaser uses a terminal 502 having a web browser an and Internet connection to access the shipping company's web server 504 where shipping services can be ordered. Here the purchaser can indicate the date the purchaser wishes to ship a parcel, the size of the parcel, the level of service desired, the pick up location, the destination location, and other shipping information. This information transfer is depicted by line 550. The shipping company web server 504 can forward the package data to the shipping company sales module 507 where the purchase is recorded and the information is distributed to other shipping company modules. This information transfer is depicted by line 552. The shipping company tracking module 506 can receive parcel information for picking up, tracking, and delivering the parcel. This information transfer is represented by line 553. The package information can then be forwarded to the appropriate shipping company employees to dispatch a package delivery vehicle 514 at the appropriate time and location, which is represented by line 556. The shipping company modules, such as modules 504, 506, 507, and 508 described above can preferably be as described in published international patent application publication WO 00/46728, published on Aug. 10, 2000, which describes Internet package shipping systems and related methods. WO 00/46728 is hereby incorporated by reference.

The employees responsible for picking up, routing, and delivering the package 516 provide information to the tracking module 506 throughout the delivery process so that the purchaser 100 can track the package 516, this information is shown by line 560. The package delivery vehicle 514 is shown transferring package 516 from the pick up location 518 to the delivery location 520. The delivery of the package can, of course, comprise a more complex process including sending the package via aircraft, and routing it through multiple sorting hubs.

The shipping company billing module can receive information regarding the purchase necessary for billing the purchaser, which is shown by line 554. This information can include a purchaser identifier so that a purchaser profile can be recalled from computer memory. The use of profiles in this manner is described in previously referenced application WO 00/46728. The billing module can store this information as it is received for generating an invoice at a later time, or the information can be transferred to the billing module and recorded at periodic intervals that coincide with billing cycles, for example. The information can include an indication of the purchaser's identity such as a customer account number, and enough additional information to determine the shipping charges for the services requested by the purchaser. It should be understood, however, that this information could also come from the web server 504 at the time the services are ordered and recorded by the billing module 508.

The billing module 508 periodically generates an invoice as described in FIG. 2 and shown in FIG. 4. The generated invoice indicates the charges for shipping services during the billing cycle and indicates the amount of any incentives that were earned during the billing cycle as discussed previously. To generate the invoice, the billing module 508 can use information (represented by line 562) from the lender accounting module 510 to determine if there is a required loan payment owed purchaser for the billing cycle, and if so the amount of that payment. The lender accounting module tracks the loan balance and payment information for the purchaser's loan. With this information, the billing module 508 can determine if the incentives earned during the billing cycle cover the loan payment. The invoice can then indicate if there is a shortfall (earned incentives less than loan payment) or a surplus (incentives exceed loan payment) as described above.

The invoices generated may be printed invoices that are mailed to the purchaser 100, or electronic invoices that are sent to the purchaser via email or otherwise made electronically available to the purchaser. In FIG. 5, the use of an electronic invoice is depicted. The electronic invoice is sent to the web server 504 (represented by line 564) where it can be stored and forwarded on to the purchaser directly via electronic mail, by sending an electronic mail with a hypertext link to the invoice, or displayed to the purchaser upon the purchaser's next visit to the web server. Sending the invoice to the purchaser terminal is represented by line 566.

The purchaser 100 can review the invoice prior to paying transferring funds to the shipping company. The purchaser can provide authorization for the purchaser accounting module 512 to release funds to pay for the invoice to the shipping company. The authorization is represented by line 568. Upon receiving authorization, the purchaser accounting module 512 can facilitate the transfer of funds from a purchaser's account to the shipping company. The transfer of funds is represented by line 570 connecting the purchaser accounting module 512 to the shipping company billing module 508.

The transfer of money from the purchaser to the shipping company can occur in a number of other ways as well. For example, the purchaser could authorize the shipping company to automatically extract the invoice amount from a purchaser account at the end of each billing cycle.

Once the shipping company billing module 508 has received the purchaser's invoice payment, the billing module 508 can facilitate the transfer funds to the lender accounting module 510 to cover the required loan payment. This transfer is represented by line 572. The process of providing an invoice each billing cycle, receiving money from the purchaser, and transferring funds to the lender can continue until the loan is paid back in full.

Though the invented system and method has been described above with a focus on a shipping services context, it should be understood that the invented system and method can be used to provide an advance incentive loan in association with the sale of a wide range of goods or services. An advance on to-be-earned incentives can be provided using the present invention where discounts are offered not just on shipping services, but on any goods or services that are purchased over a period of time.

Figure 6A:
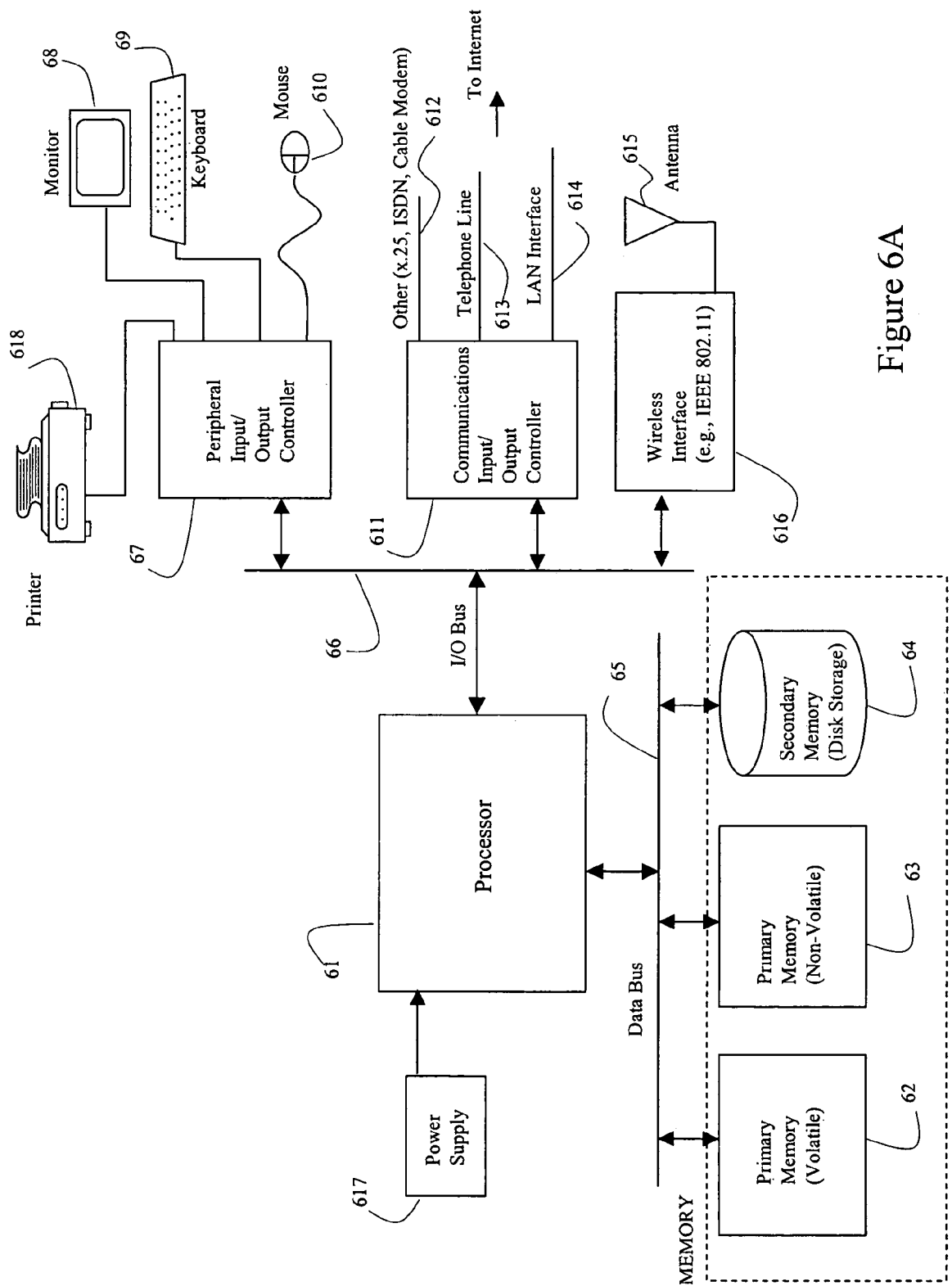
FIGS. 6A and 6B show examples of computer devices that can be used to implement the present invention.

Method steps of the present invention can be completed by updating computer memories or transferring information from one computer memory to another. Examples of computer components that can be used to implement the present invention (for example, the modules of FIG. 5) are described in FIGS. 6A and 6B. Turning to FIG. 6A, one embodiment of a computer is illustrated that can be used to practice aspects of the present invention. The systems and methods of the present invention can be implemented using computer hardware and computer readable memory containing information and instructions to carry out the disclosed method. In FIG. 6A, a processor 61, such as a microprocessor, is used to execute software instructions for carrying out the defined steps. The processor receives power from a power supply 617 that also provide power to the other components as necessary. The processor 61 communicates using a data bus 65 that is typically 16 or 32 bits wide (e.g., in parallel). The data bus 65 is used to convey data and program instructions, typically, between the processor and memory. In the present embodiment, memory can be considered primary memory 62 that is RAM or other forms which retain the contents only during operation, or it may be non-volatile 63, such as ROM, EPROM, EEPROM, FLASH, or other types of memory that retain the memory contents at all times. The memory could also be secondary memory 64, such as disk storage, that stores large amount of data. In some embodiments, the disk storage may communicate with the processor using an I/O bus 66 instead or a dedicated bus (not shown). The secondary memory may be a floppy disk, hard disk, compact disk, DVD, or any other type of mass storage type known to those skilled in the computer arts. One of ordinary skill will recognize that as data is transferred between two or more computing devices (in accordance with the above-described processing steps), the data is read from and written to one or more of these memory areas and the memory area is physically changed as a result of the process.

The processor 61 also communicates with various peripherals or external devices using an I/O bus 66. In the present embodiment, a peripheral I/O controller 67 is used to provide standard interfaces, such as RS-232, RS422, DIN, USB, or other interfaces as appropriate to interface various input/output devices. Typical input/output devices include local printers 618, a monitor 68, a keyboard 69, and a mouse 610 or other typical pointing devices (e.g., rollerball, trackpad, joystick, etc.).

The processor 61 typically also communicates using a communications I/O controller 611 with external communication networks, and may use a variety of interfaces such as data communication oriented protocols 612 such as X.25, ISDN, DSL, cable modems, etc. The communications controller 611 may also incorporate a modem (not shown) for interfacing and communicating with a standard telephone line 613. Finally, the communications I/O controller may incorporate an Ethernet interface 614 for communicating over a LAN. Any of these interfaces may be used to access the Internet, intranets, LANs, or other data communication facilities.

Finally, the processor 61 may communicate with a wireless interface 616 that is operatively connected to an antenna 615 for communicating wirelessly with another devices, using for example, one of the IEEE 802.11 protocols, 802.15.4 protocol, or a standard 3G wireless telecommunications protocols, such as CDMA2000 1×EV-DO, GPRS, W-CDMA, or other protocol.

Figure 6B:
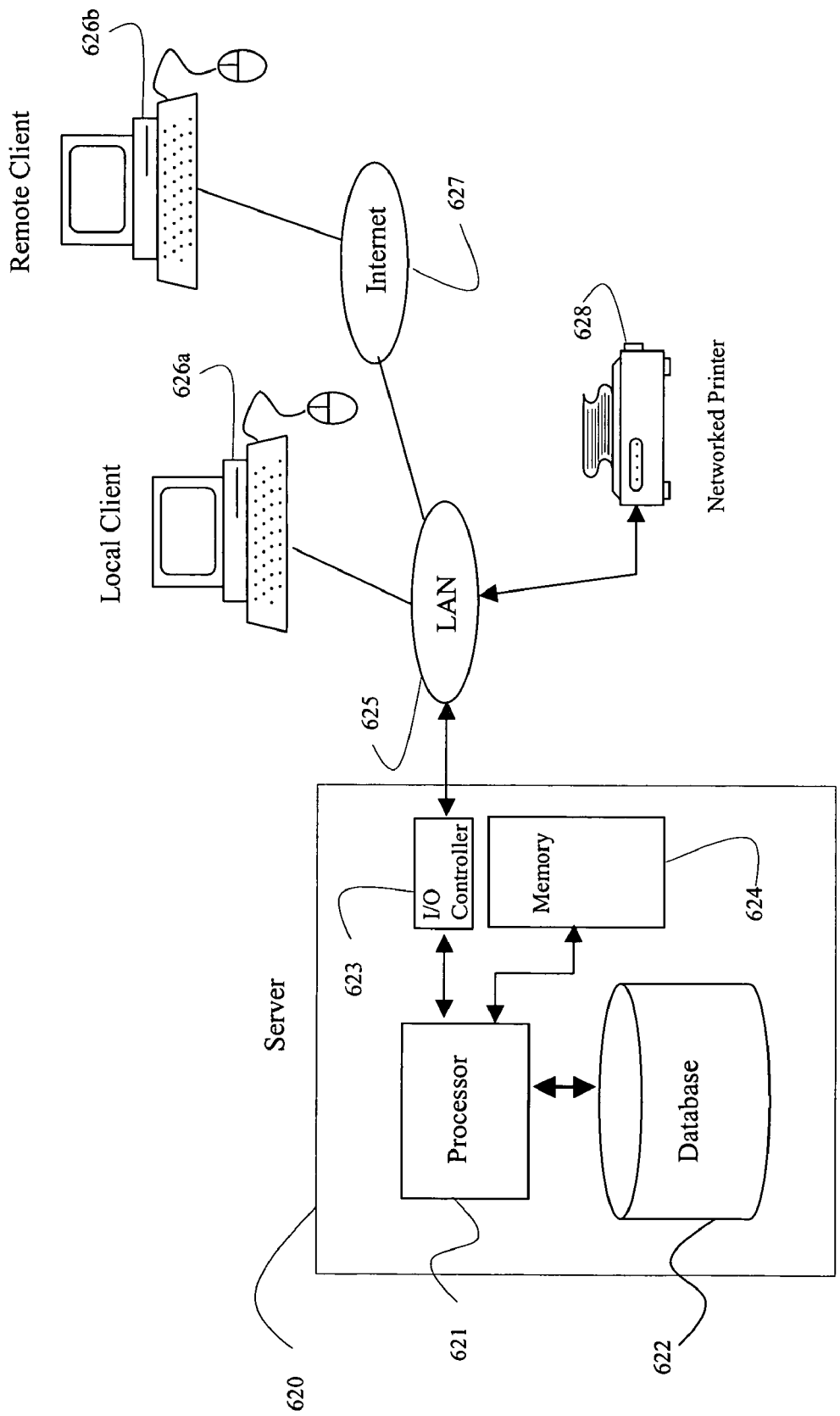

An alternative embodiment of a processing system than may be used is shown in FIG. 6B. In this embodiment, a distributed communication and processing architecture is shown involving a server 620 communicating with either a local client computer 626a or a remote client computer 626b. The server 620 typically comprises a processor 621 that communicates with a database 622, which can be viewed as a form of secondary memory, as well as primary memory 624. The processor also communicates with external devices using an I/O controller 623 that typically interfaces with a LAN 625. The LAN may provide local connectivity to a networked printer 628 and the local client computer 626a. These may be located in the same facility as the server, though not necessarily in the same room. Communication with remote devices typically is accomplished by routing data from the LAN 625 over a communications facility to the Internet 627. A remote client computer 626b may execute a web browser, so that the remote client 626b may interact with the server as required by transmitted data through the Internet 627, over the LAN 625, and to the server 620.

Those skilled in the art of data networking will realize that many other alternatives and architectures are possible and can be used to practice the principles of the present invention. The embodiments illustrated in FIGS. 6a and 6b can be modified in different ways and be within the scope of the present invention as claimed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method utilizing an advance-incentive-loan computer system to provide an advance-incentive loan to a purchaser in association with projected future purchase of goods or services from a seller, the method comprising:
    projecting by the computer system a value of agreed-upon incentives to be applied to actual future purchases over a period of time, wherein the computer system is configured to project the value of said agreed-upon incentives by:
        estimating a volume of the projected future purchases to be made by the purchaser over said period of time based on past purchase volumes;
        calculating a projected sales revenue for the seller at a first price for the projected future purchases over said period of time;
        calculating a projected sales revenue for the seller at a second price for the projected future purchases over said period of time, the second price being less than the first price and being determined based on the estimated volume of the projected future purchases; and
        calculating the difference between the projected sales revenue at the first price over said period of time and the projected sales revenue at the second price over said period of time; and
    providing by said computer system the advance-incentive loan to the purchaser, wherein an amount of the advance-incentive loan is based on a present value of the projected value of the agreed-upon incentives calculated using an interest rate and said period of time, and wherein payments made by the purchaser in association with actual future purchases include an amount of interest on the advance-incentive loan.

2. The method of claim 1 wherein the services purchased are shipping services.

3. The method of claim 1 further comprising:
    applying with the computer system incentives earned on actual sales against a required loan payment.

4. The method of claim 3 further comprising:
    billing with the computer system the purchaser for any amount of the loan payment not covered by the incentives earned when the amount of the incentives earned is less than the required loan payment.

5. The method of claim 3 further comprising:
refunding with the computer system an amount of the incentives earned to the purchaser that is in excess of the required loan payment.

6. The method of claim 3 further comprising:
reducing with the computer system the purchaser's bill by an amount of the incentives earned that is in excess of the required loan payment.

7. The method of claim 3 further comprising:
applying with the computer system an amount of the incentives earned that is in excess of the required loan payment to a principal of the advance-incentive loan.

8. The method of claim 3 further comprising:
applying with the computer system an amount of the incentives earned that is in excess of the required loan payment to a subsequent bill.

9. The method of claim 1 further comprising:
presenting with the computer system to the purchaser from the seller a statement detailing charges for purchases, incentives earned, and amount of incentives earned applied to a loan payment.

10. The method of claim 1 further comprising:
collecting with the computer system funds at an undiscounted price for goods or services purchased; and
applying with the computer system a portion of said funds as payment on the advance-incentive loan, the portion being based on incentives earned.

11. The method of claim 10 further comprising:
collecting with the computer system an additional amount to cover a loan payment shortfall where the incentives earned during a period are less than a required loan payment.

12. The method of claim 1 wherein, in determining the loan amount, the advance-incentive-loan computer system creates an amortization schedule for the present value of the difference using the interest rate and the time period.

13. The method of claim 1 wherein the seller of the goods or services utilizes the computer system to loan the amount to the purchaser.

14. The method of claim 1 wherein a third party financial institution utilizes the computer system to loan the amount to the purchaser.

* * * * *

UNITED STATES PATENT AND TRADEMARK OFFICE
CERTIFICATE OF CORRECTION

| | | |
|---|---|---|
| PATENT NO. | : 7,729,980 B2 | |
| APPLICATION NO. | : 10/884581 | |
| DATED | : June 1, 2010 | |
| INVENTOR(S) | : Mittenzwei et al. | |

It is certified that error appears in the above-identified patent and that said Letters Patent is hereby corrected as shown below:

Column 10,

Line 47, "1%" should read --11%--.

Signed and Sealed this

Twenty-third Day of August, 2011

David J. Kappos
*Director of the United States Patent and Trademark Office*